United States Patent
Hayashi et al.

(10) Patent No.: US 9,036,237 B2
(45) Date of Patent: May 19, 2015

(54) LASER SCANNER

(71) Applicants: Yuusuke Hayashi, Kanagawa (JP);
Mitsuru Nakajima, Kanagawa (JP);
Shuichi Suzuki, Kanagawa (JP);
Kenichi Yoshimura, Kanagawa (JP)

(72) Inventors: Yuusuke Hayashi, Kanagawa (JP);
Mitsuru Nakajima, Kanagawa (JP);
Shuichi Suzuki, Kanagawa (JP);
Kenichi Yoshimura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 60 days.

(21) Appl. No.: 13/909,340

(22) Filed: Jun. 4, 2013

(65) Prior Publication Data
US 2014/0002878 A1    Jan. 2, 2014

(30) Foreign Application Priority Data

Jun. 28, 2012    (JP) ................. 2012-144876

(51) Int. Cl.
| | |
|---|---|
| G02B 26/10 | (2006.01) |
| F16D 3/04 | (2006.01) |
| G02B 7/182 | (2006.01) |
| G02B 26/12 | (2006.01) |
| G06K 7/10 | (2006.01) |

(52) U.S. Cl.
CPC ............. *G02B 26/105* (2013.01); *F16D 3/04* (2013.01); *G02B 7/1821* (2013.01); *G02B 26/121* (2013.01); *G06K 7/10623* (2013.01)

(58) Field of Classification Search
CPC ............................ G02B 26/105; G02B 7/1821
USPC .................. 359/223.1, 221.2, 226.1, 872, 874
See application file for complete search history.

(56) References Cited

U.S. PATENT DOCUMENTS

| | | | |
|---|---|---|---|
| 3,063,264 A | 11/1962 | Forrest | |
| 2008/0260312 A1* | 10/2008 | Nishino et al. | ................. 384/446 |
| 2009/0297211 A1 | 12/2009 | Kanno et al. | |
| 2010/0087260 A1 | 4/2010 | Maki et al. | |
| 2013/0077083 A1 | 3/2013 | Suzuki et al. | |
| 2013/0120734 A1 | 5/2013 | Ogata et al. | |

FOREIGN PATENT DOCUMENTS

| | | | |
|---|---|---|---|
| JP | 2005-134630 | 5/2005 | |
| JP | 2006-267616 | 10/2008 | |
| JP | 2010-048897 | * 3/2010 | ............. G02B 26/10 |
| JP | 2010-48897 | 3/2010 | |

OTHER PUBLICATIONS

Sep. 12, 2013 European search report in connection with corresponding European patent application No. 13171534.4.

* cited by examiner

*Primary Examiner* — Joseph P Martinez
(74) *Attorney, Agent, or Firm* — Cooper & Dunham LLP

(57) ABSTRACT

A laser scanner includes an optical source emitting a laser beam; and an optical deflector deflecting the laser beam emitted from the optical source to scan an object with the laser beam deflected thereby, wherein the optical deflector includes a reflecting mirror; a motor rotating the reflecting mirror around an axis of the mirror: a first member fixed on a shaft of the motor, rotating with the shaft and a second member fixed on the axis of the mirror, engaging with the first member when the shaft rotates to rotate with the axis of the mirror.

10 Claims, 14 Drawing Sheets

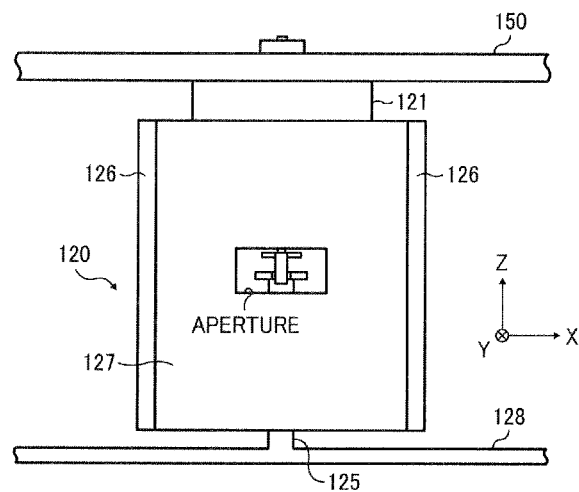
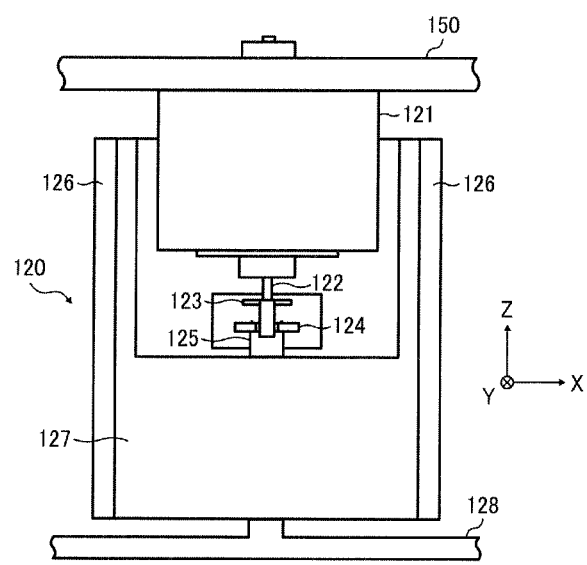

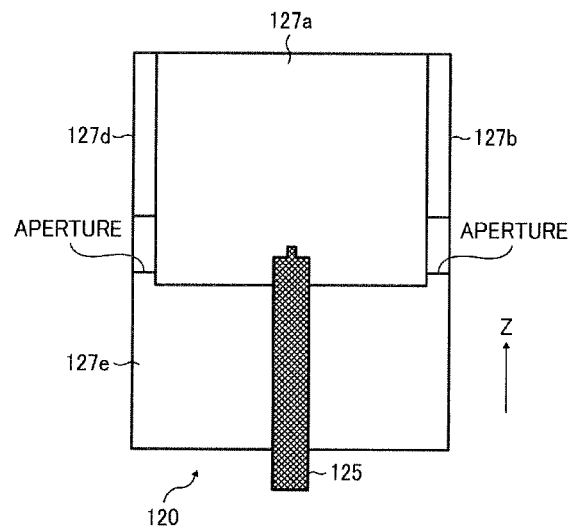
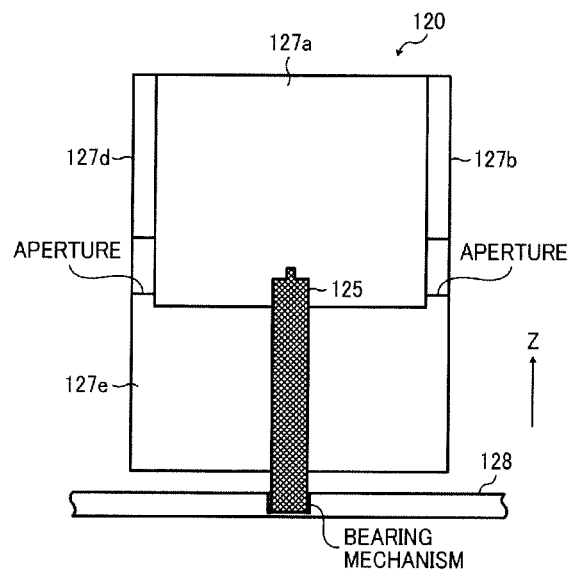

LASER SCANNER

CROSS-REFERENCE TO RELATED APPLICATIONS

This patent application is based on and claims priority pursuant to 35 U.S.C. §119 to Japanese Patent Application No. 2012-144876, filed on Jun. 28, 2012, in the Japan Patent Office, the entire disclosure of which is hereby incorporated by reference herein.

BACKGROUND

1. Technical Field

The present invention relates to a laser scanner, more particularly to a laser scanner having an optical deflector.

2. Description of the Related Art

A laser scanner emitting a laser beam to an object to scan the object typically used for an optical writing unit, a barcode scanners and a distance measurer in an image forming apparatus such as a printer.

The laser scanner includes an optical source emitting a pulse-shaped laser beam and an optical deflector deflecting the laser beam emitted from the light source to an object.

Japanese published unexamined application No. JP-2006-267616-A discloses a polygon scanner motor in which eccentricity of the polygon mirror reflection surface is reduced to downsize a scanning optical apparatus and produce high-quality images.

Further improvement of scanning preciseness of a laser scanner is now demanded, and conventional laser scanners are difficult to improve their scanning preciseness without costing more.

Because of these reasons, a need exist for a laser scanner having higher scanning preciseness without costing more.

SUMMARY

Accordingly, one object of the present invention to provide a laser scanner having higher scanning preciseness without costing more.

This object of the present invention has been satisfied by the discovery of a laser scanner, comprising:
an optical source configured to emit a laser beam; and
an optical deflector configured to deflect the laser beam emitted from the optical source to scan an object with the laser beam deflected thereby,
wherein the optical deflector comprises:
a reflecting mirror;
a motor configured to rotate the reflecting mirror around an axis of the mirror:
a first member fixed on a shaft of the motor, configured to rotate with the shaft; and
a second member fixed on the axis of the mirror, configured to engage with the first member when the shaft rotates to rotate with the axis of the mirror.

In the present invention, that the first member and the second member rotate while engaged means that they simply rotate in conjunction with each other and may have a backlash therebetween.

This object, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 4 is a front view illustrating the optical deflector in FIG. 1;

FIG. 5 is a cross-sectional view of FIG. 4;

FIG. 10 is a schematic view for explaining a mirror axis inserted into a through-hole of the mirror base with pressure;

FIG. 11 is a schematic view for explaining the mirror axis held by the base;

DETAILED DESCRIPTION

Figure 1:
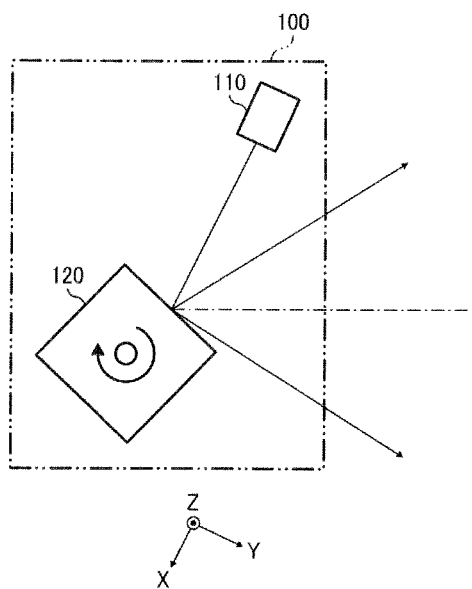
FIG. 1 is a schematic view for explaining an outline of an embodiment of the laser scanner of the present invention.

The present invention provides a laser scanner having higher scanning preciseness without costing more.

More particularly, the present invention relates to a laser scanner, comprising:
an optical source configured to emit a laser beam; and
an optical deflector configured to deflect the laser beam emitted from the optical source to scan an object with the laser beam deflected thereby,
wherein the optical deflector comprises:
a reflecting mirror;
a motor configured to rotate the reflecting mirror around an axis of the mirror:

a first member fixed on a shaft of the motor, configured to rotate with the shaft; and a second member fixed on the axis of the mirror, configured to engage with the first member when the shaft rotates to rotate with the axis of the mirror.

Exemplary embodiments of the present invention are described in detail below with reference to accompanying drawings. In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

FIG. 1 is a schematic view for explaining an outline of an embodiment of the laser scanner of the present invention.

Figure 3:
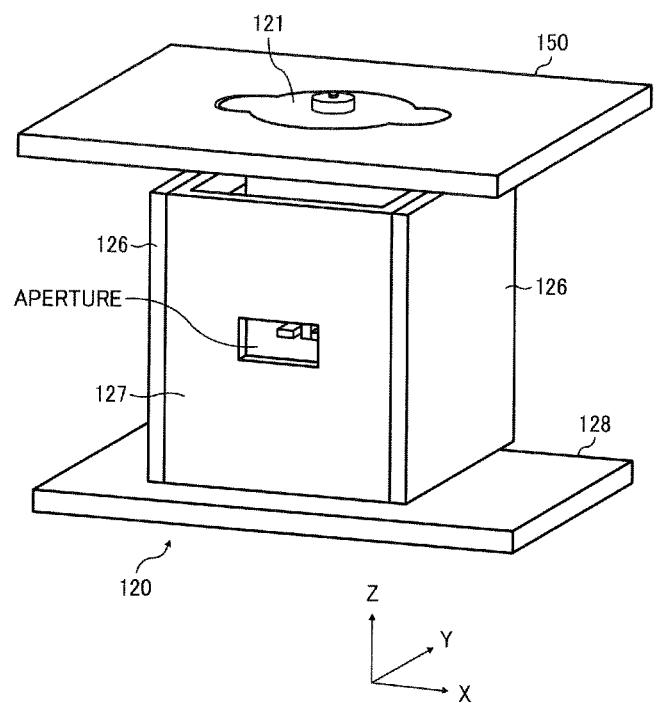
FIG. 3 is a perspective view illustrating the optical deflector in FIG. 1.

A laser scanner 100 includes an optical source 110 emitting a laser beam, an optical deflector 120 deflecting the laser beam emitted from the optical source 110 and a holder 150 (omitted in FIG. 1. Refer to. FIG. 3) holding the optical source 110 and the optical deflector 120. In the present invention, in an XYZ three-dimensional orthogonal coordinate system, X-axial direction is an axial direction parallel to a travel direction of the laser beam emitted from the optical source 110, and Z-axial direction is a direction perpendicular to a deflection surface (Ref. Japanese published unexamined application No. JP-H11-202252-A) which is a light flux surface formed by the laser beam deflected by the optical deflector 120 with time.

Figure 2:
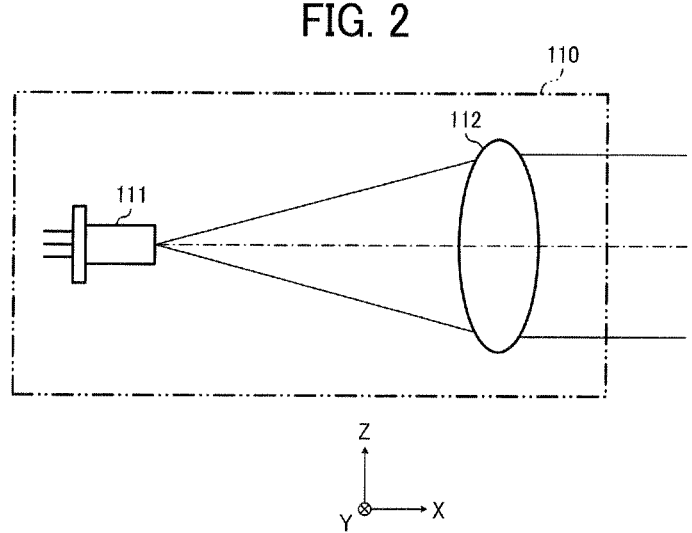
FIG. 2 is a schematic view for explaining the optical source in FIG. 1.

The optical source 110 includes, as FIG. 2 shows, a laser diode 111 and a collimator lens 112 converting the laser beam emitted from the laser diode 111 into nearly parallel light. The laser diode 111 and the collimator lens 112 are placed on an optical source holder (unillustrated) in a predetermined positional relation. The optical source holder is held by the holder 150.

The optical deflector 120 includes, as FIGS. 3 to 5 show, a motor 121, a shaft 122, a first adaptor 123, a second adaptor 124, a mirror axis 125, two reflecting mirrors 126, a mirror base 127 and a base 128. FIG. 3 is a perspective view illustrating the optical deflector 120 and FIG. 4 is a front view illustrating the optical deflector 120. FIG. 5 is a cross-sectional view of the mirror base 127 in FIG. 4 to show an inside thereof.

The motor 121 is held by the holder 150 such that a motor axis is parallel with Z-axis. An electric power to drive the motor 121 is fed from the outside.

The shaft 122 is fixed on a motor axis of the motor 121 so as to be parallel with Z-axis. An electric power is fed to the motor 121 from the outside to drive the motor 121, and the shaft 122 rotates around the axis parallel with Z-axis.

Figure 6:
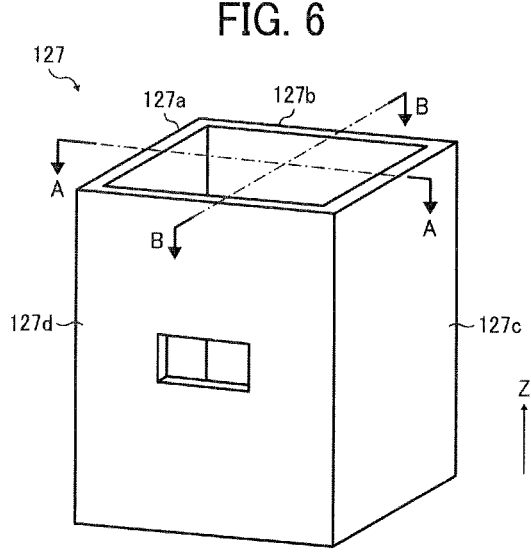
FIG. 6 is a perspective view illustrating a mirror base.
Figure 7:
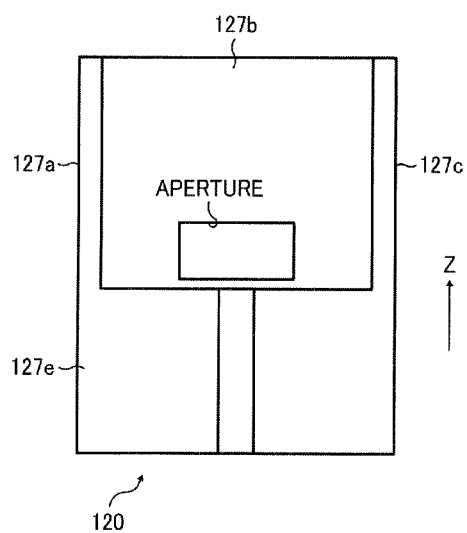
FIG. 7 is an A-A cross-sectional view of FIG. 6.
Figure 8:
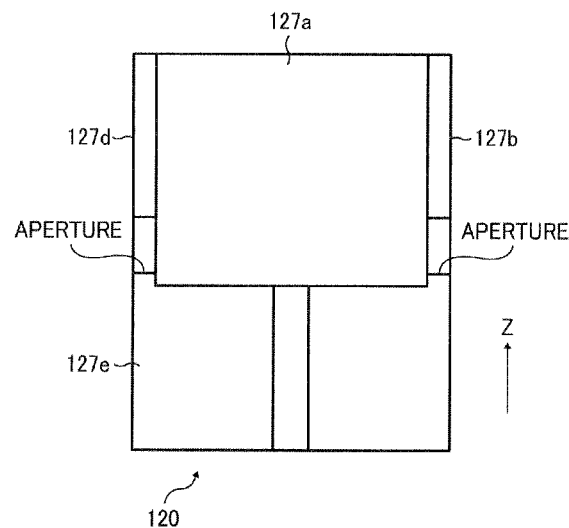
FIG. 8 is a B-B cross-sectional view of FIG. 6.

FIG. 6 is a perspective view illustrating a mirror base 127, FIG. 7 is an A-A cross-sectional view of FIG. 6, and FIG. 8 is a B-B cross-sectional view of FIG. 6. The mirror base 127 is formed of four side panels 127a to 127d parallel with Z-axis and a quadrangular-prism-shaped block 127e located at −Z side in an inner space formed by the four side panels 127a to 127d. The side panels 127a and 127c face each other, and the side panels 127b and 127d face each other.

A reflecting mirror is fixed on each of the side panels 127a and 127c. An aperture is formed on each of the side panels 127b and 127d.

Figure 9:
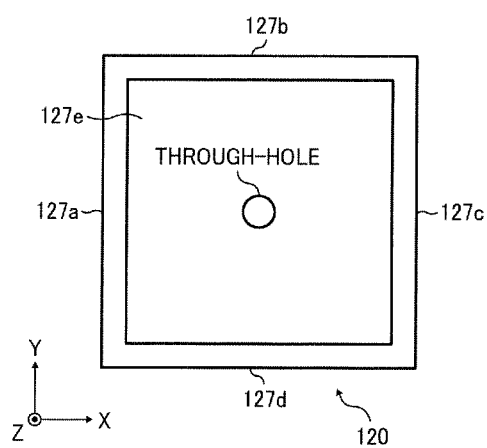
FIG. 9 is a plain view of the mirror base.

As FIG. 9 shows, a through-hole extending in Z-axis direction is formed at the center of the block 127e.

The four side panels 127a to 127d and the block 127e may integrally be formed. The mirror base 127 may be formed of a resin.

The mirror axis 125 is a metallic bar having longitudinal in Z-axis direction. An end of the mirror axis 125 at +Z side is modified to have the shape of a tenon.

The mirror axis 125 is, as FIG. 10 shows, inserted into the through-hole of the block 127e with pressure.

The base 128 holds an end of the mirror axis 125 at −Z side through a bearing mechanism. Even though the base 128 is fixed, the mirror axis 125 rotates around an axis parallel with Z-axis. When the mirror axis 125 rotates, the mirror base 127 and the two reflecting mirrors 126 rotate around a rotational axis of the mirror axis 125.

In FIG. 5, the first adaptor 123 is fixed on an end of the shaft 122 at −Z side. When the shaft 122 rotates, the first adaptor 123 rotates as well. The shaft 122 and the first adaptor 123 have the same rotational axis.

The second adaptor 124 is fixed on an end of the mirror axis 125 at +Z side.

The first adaptor 123 and the second adaptor 124 are die-cast aluminum, but are not limited thereto.

The first adaptor 123 and the second adaptor 124 are engaged with each other. When the first adaptor 123 rotates, the second adaptor 124 rotates as well, and the mirror axis 125 rotates. The second adaptor 124 and the mirror axis 125 have the same rotational axis.

The aperture of the side panel of the mirror base 127 is formed such that the engaged part between the first adaptor 123 and the second adaptor 124 can be seen from the outside (FIG. 4).

The first adaptor 123 and the second adaptor 124 preferably have round corners so as to contact their surfaces with each other.

A variety of the first adaptors 123 and the second adaptors 124 can be thought.

Figure 12:
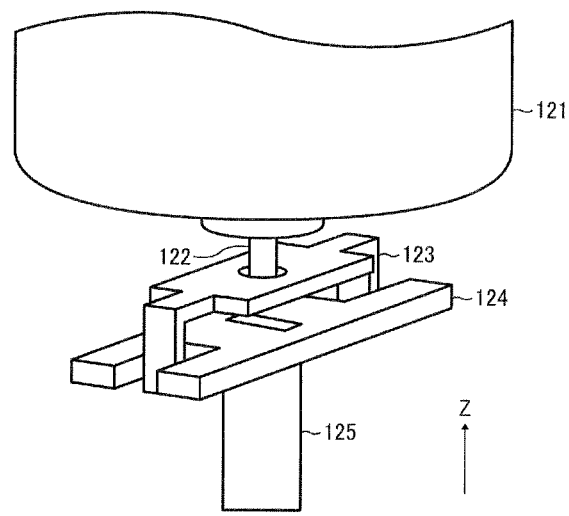
FIG. 12 is a schematic view for explaining a relation between a first adaptor and a second adaptor.

FIG. 12 shows a specific example of the first adaptors 123 and the second adaptors 124.

Figure 13:
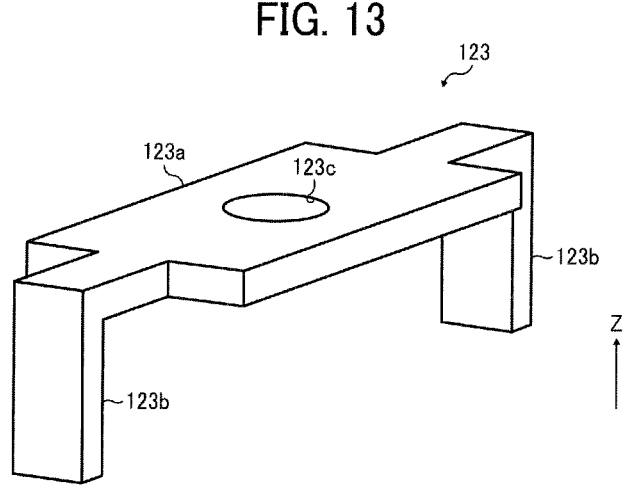
FIG. 13 is a schematic view for explaining the first adaptor.

The first adaptor 123 includes, as FIG. 13 shows, a rectangular flat plate 123a parallel with an XY plane and projections 123b extending in −Z axial direction from both ends of the flat plate 123a in its longitudinal direction. An aperture 123c the shaft 122 is inserted into is formed at the center of the flat plate 123a.

Figure 14:
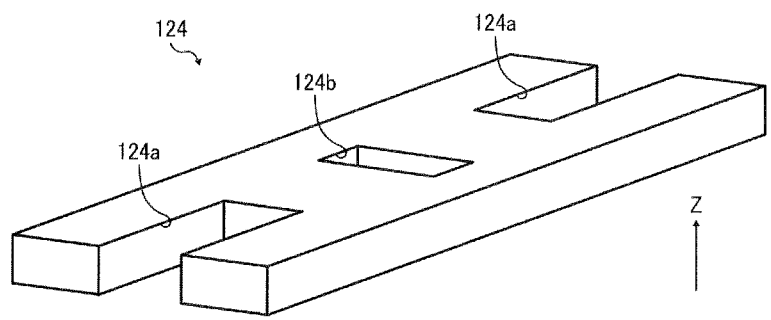
FIG. 14 is a schematic view for explaining the second adaptor.

The second adaptor 124 is, as FIG. 14 shows, is a rectangular plate-shaped parallel with an XY plane, including notches 124a at both ends in its longitudinal direction. A mortise 124b an end of the mirror axis 125 at +Z side is inserted into is formed at the center of the second adaptor 124.

Figure 15:
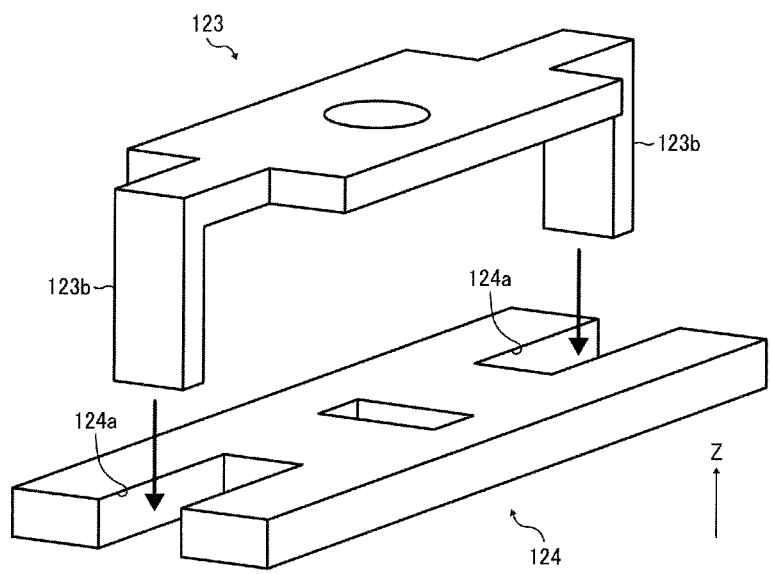
FIG. 15 is a schematic view for explaining an engagement between the first adaptor and the second adaptor.

The projections 123b of the first adaptor 123 are inserted into the notches 124a of the second adaptor 124 to engage the first adaptor 123 with the second adaptor 124 (FIG. 15).

Therefore, even when the shaft 122 and the mirror axis 125 are separate from each other, rotation of the shaft 122 can be transmitted to the mirror axis 125.

Figure 16:
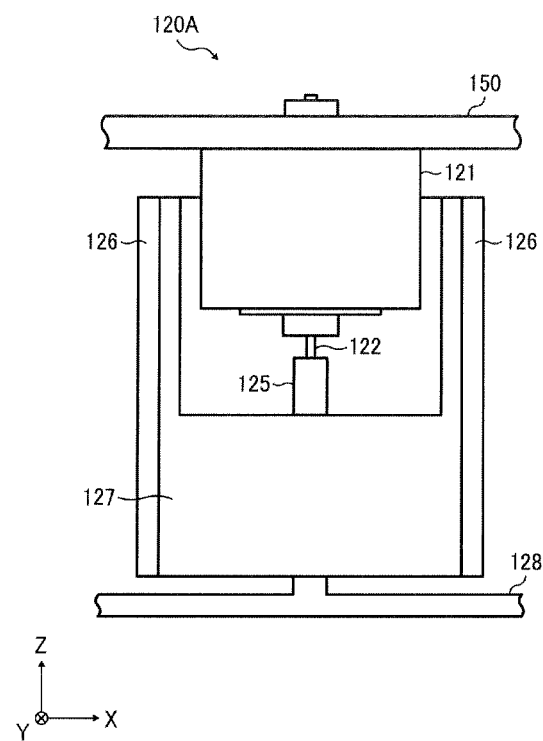
FIG. 16 is a schematic view for explaining a conventional optical deflector.

FIG. 16 shows a conventional optical deflector 120A. In the deflector 120A, a mirror axis is fixed on a shaft 122. Namely, rotation of a motor 121 is transmitted to a mirror axis 125 through the shaft 122. In this case, when the shaft 122 has eccentricity when rotating, a mirror base 127 also eccentrically rotates, resulting in possible error of optical deflection direction.

A high-precision modification is needed to conform a rotational axis of the motor to that of the shaft 122, resulting in increase of modification cost and complication of the laser scanner.

However, in the optical deflector 120 of the embodiment, the shaft 122 and the mirror axis 125 separate from each other and the mirror base 127 rotates without eccentricity even though the shaft 122 eccentrically rotates. Namely, the optical deflector 120 of the embodiment improves scanning preciseness without cost increase.

Figure 17:
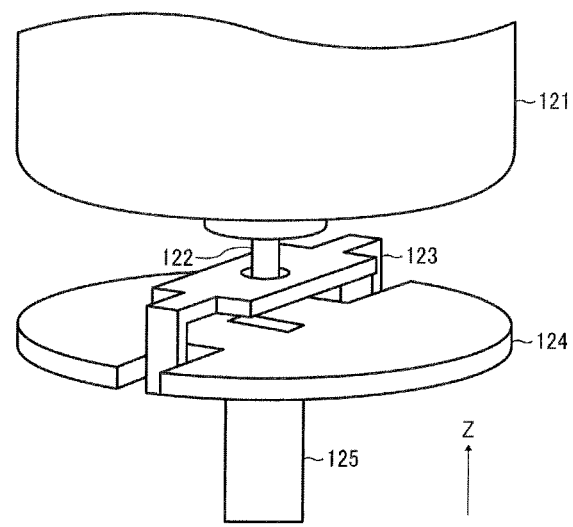
FIG. 17 is a schematic view for explaining Modified Example 1 of the second adaptor.

FIG. 17 shows a modified example of the second adaptor 124. The second adaptor 124 may have the shape of a circular disc. Projections 123b of a first adaptor 123 can precisely be inserted into notches 124a of a second adaptor 124 with ease. Namely, engagement between the first adaptor 123 and the second adaptor 124 is easy and precise. Therefore, a time of assembly process can be shortened.

Figure 18:
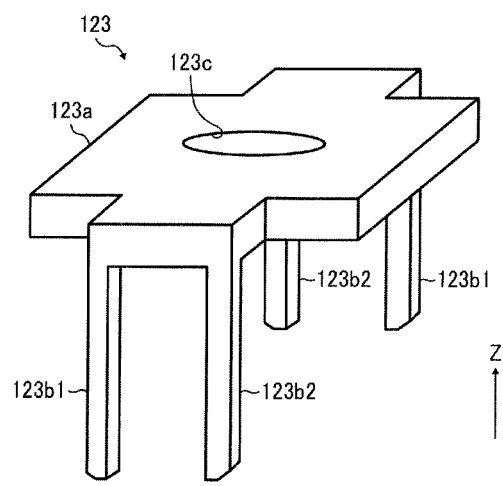
FIG. 18 is a schematic view for explaining Modified Example 1 of the first adaptor.

As FIG. 18 shows, each of the projections 123b of the first adaptor 123 may be divided into two projections 123b1 and 123b2 facing each other in a short direction of the flat plate 123a.

Figure 19:
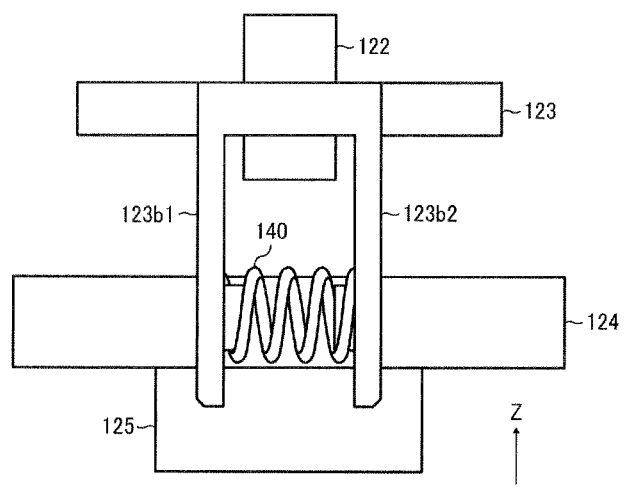
FIG. 19 is a schematic view for explaining an application of a spring.
Figure 20:
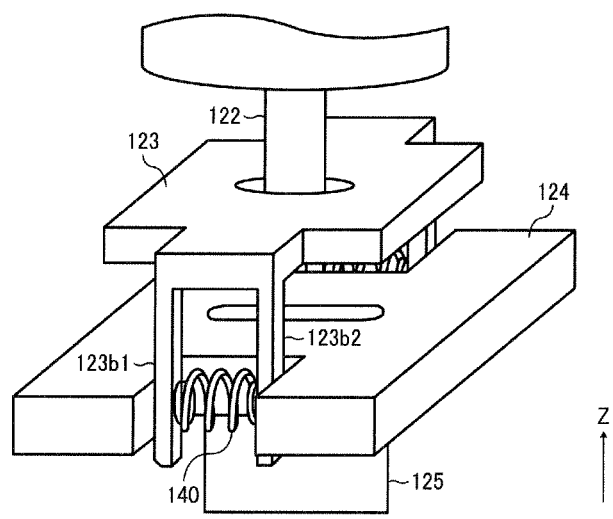
FIG. 20 is another schematic view for explaining the application of the spring in FIG. 19.

In this case, as FIGS. 19 and 20 show, a spring 140 may be located between the projections 123b1 and 123b2 inserted into the same notches 124a of the second adaptor 124 such that the projections 123b1 and 123b2 are biased in a direction of contacting the notches 124a of the second adaptor 124.

When there is a gap between the projection of the first adaptor 123 and the notch of the second adaptor 124, the first adaptor 123 and the second adaptor 124 repeat contacting with and separating from each other to make a noise during the rotation. However, the spring 140 located between the projections 123b1 and 123b2 clears the gap between the projection of the first adaptor 123 and the notch of the second adaptor 124 to prevent the noise during the rotation.

Figure 21:
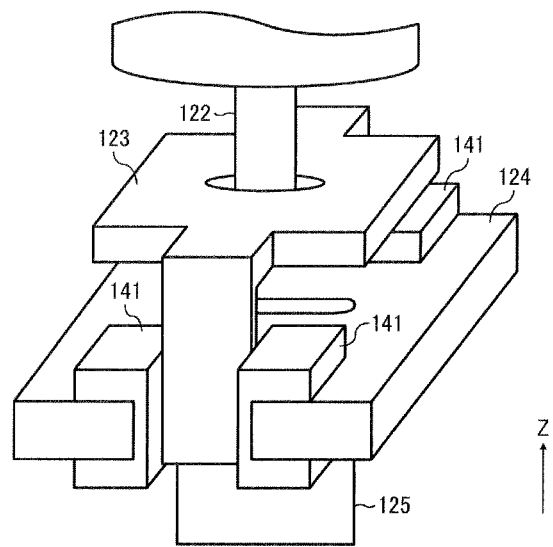
FIG. 21 is a schematic view for explaining an application of a member having high slidability.
Figure 22:
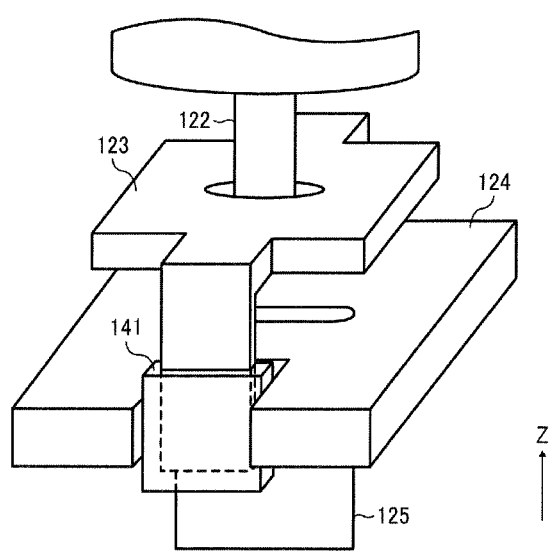
FIG. 22 is a schematic view for explaining an application of another member having high slidability.

As FIGS. 21 and 22 show, a member having high slidability 141 may be located between the projection of the first adaptor 123 and the notch of the second adaptor 124. This reduces backlashes between the projections of the first adaptor 123 and the notches of the second adaptor 124, and frictional noises therebetween as well. The member having high slidability 141 can be formed of polyacetal, polyamide, polytetrafluoroethylene, etc.

Instead of placing the member having high slidability 141 between the projection of the first adaptor 123 and the notch of the second adaptor 124, the projection of the first adaptor 123 or the notch of the second adaptor 124a may be subjected to a surface treatment to improve slidability.

Figure 23:
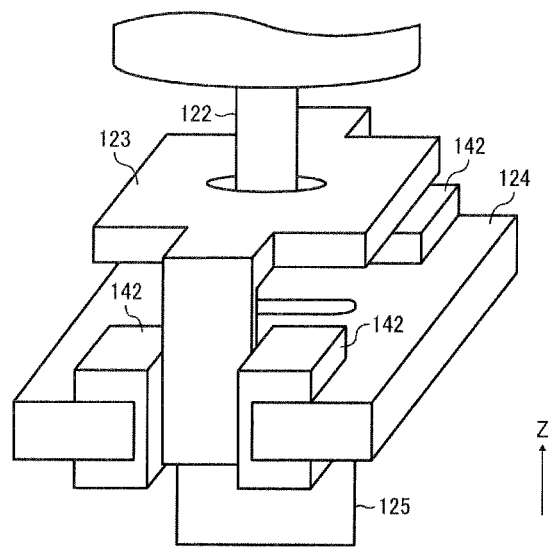
FIG. 23 is a schematic view for explaining an application of a member having low hardness.
Figure 24:
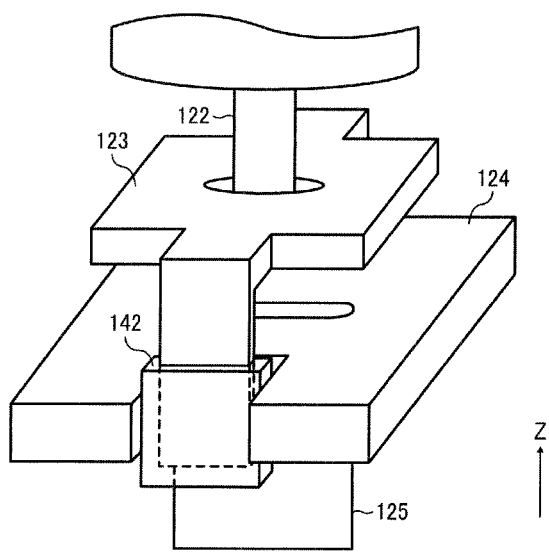
FIG. 24 is a schematic view for explaining an application of another member having low hardness.

As FIGS. 23 and 24 show, a member having low hardness 142 may be located between the projection of the first adaptor 123 and the notch of the second adaptor 124. This reduces backlashes between the projections of the first adaptor 123 and the notches of the second adaptor 124, and frictional noises therebetween as well. The member having low hardness 142 can be formed of polyacetal, silicon rubber, etc.

Figure 25:
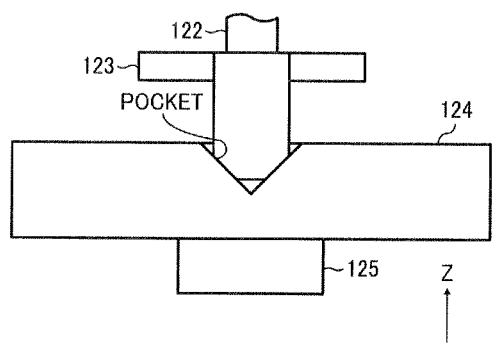
FIG. 25 is a schematic view for explaining Modified Example 2 of the first adaptor and the second adaptor.
Figure 26:
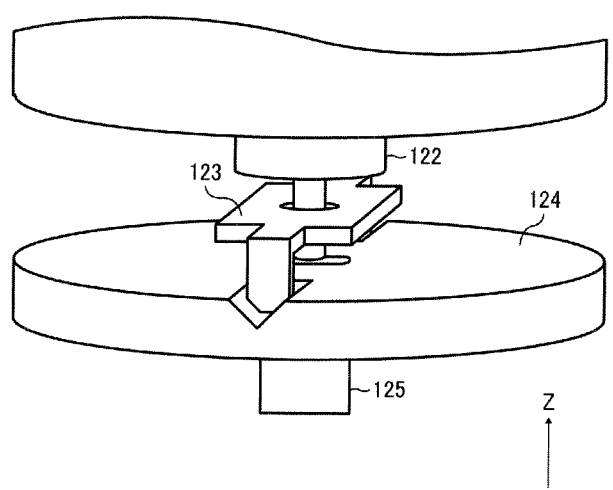
FIG. 26 is another schematic view for explaining Modified Example 2 of the first adaptor and the second adaptor in FIG. 25.

Instead of forming a notch on the second adaptor 124, as FIGS. 25 and 26 show, a V-shaped pocket may be formed, and an end of the projection of the first adaptor 123 may have the shape of a trapezoid or a truncated cone. In this case, the end of the projection of the first adaptor 123 is biased in a direction of −Z to be pressed against the pocket of the second adaptor 124. Thus, the first adaptor 123 and the second adaptor 124 can be rotated without a gap between the projection of the first adaptor 123 and the pocket of the second adaptor 124. The projection of the first adaptor 123 is slidable along the pocket of the second adaptor 124 in a radial direction of the shaft 122. Therefore, even when the shaft 122 eccentrically rotates, transmission of the eccentricity to the mirror axis 125 can be prevented.

As mentioned above, the laser scanner 100 includes the optical source 110, the optical deflector 120, etc. The optical deflector 120 includes the motor 121, the shaft 122, the first adaptor 123, the second adaptor 124, the mirror axis 125, the two reflecting mirrors 126, the mirror base 127, the base 128, etc.

The first adaptor 123 is fixed on the shaft 122, and rotates therewith when the motor 121 rotates. The second adaptor 124 is fixed on the mirror axis 125 and engages with the first adaptor 123.

In this case, even when the shaft 122 and the mirror axis 125 are separate from each other, rotation of the shaft 122 can be transmitted to the mirror axis 125. Then, even when the shaft 122 eccentrically rotates, transmission of the eccentricity to the mirror axis 125 can be prevented.

Therefore, even when the shaft 122 eccentrically rotates, the two reflecting mirrors 126 rotate without eccentricity. Such a simple structure improves scanning preciseness without increasing cost.

In this embodiment, an aperture is formed on the mirror base 127 to observe from outside the engagement between the first adaptor 123 and the second adaptor 124. Thus, assembling can be made while observing the engagement therebetween. Namely, assembly becomes easier.

The laser scanner 100 of the embodiment is preferably used in an apparatus including an optical deflector deflecting a laser beam such as laser radars.

Having now fully described the invention, it will be apparent to one of ordinary skill in the art that many changes and modifications can be made thereto without departing from the spirit and scope of the invention as set forth therein.

What is claimed is:

1. A laser scanner, comprising:
an optical source configured to emit a laser beam; and
an optical deflector configured to deflect the laser beam emitted from the optical source to sea an object with the laser beam deflected thereby,
wherein the optical deflector comprises:
a reflecting mirror;
a shaft;
a motor configured to rotate the shaft fixed to a motor axis of the motor;
a first member fixed on the shaft and configured to rotate with the shaft;
a mirror axis having an end thereof coupled to the reflecting mirror; and
a second member fixed on another end of the mirror axis and configured to engage with the first member when the shaft rotates, to cause the second member and the mirror axis to rotate along with the first member when the motor drives the shaft to rotate, and
wherein the shaft and the mirror axis are distinct from each other, and even when the shaft rotates with eccentricity, the reflecting mirror rotates without eccentricity.

2. The laser scanner of claim 1, wherein one of the first member and the second member comprises a projection and the other thereof comprises a receptor the projection is inserted into.

3. The laser scanner of claim 2, wherein the other of the first member and the second member has the shape of a circular disc.

4. The laser scanner of claim 2, further comprising an elastic member configured to bias the projection in a direction of contacting the receptor.

5. The laser scanner of claim 2, wherein the projection and the receptor are slidable from each other.

6. The laser scanner of claim 2, wherein the projection and the receptor contact each other through a member having a hardness lower than those of the first member and the second member.

7. The laser scanner of claim 2, wherein the projection and the receptor contact each other through a member having a dynamic friction coefficient lower than those of the first member and the second member.

8. The laser scanner of claim 2, wherein the receptor is a notch.

9. The laser scanner of claim 2, wherein the receptor is a pocket.

10. The laser scanner of claim 1, wherein the reflecting mirror is fitted on a box mirror base, the first member and the second member are located in the mirror base, and an aperture is formed on a part of the mirror base to observe engagement of the first member and the second member.

* * * * *